United States Patent
Burns et al.

(10) Patent No.: US 7,285,949 B2
(45) Date of Patent: Oct. 23, 2007

(54) TRANSMISSION INPUT SHAFT SPEED MEASURING ASSEMBLY

(75) Inventors: James J. Burns, Whitmore Lake, MI (US); Wayne V. Denny, Alliance, OH (US); Mark A. Joki, Dover, OH (US); Mark E. LaCroix, New Hartford, CT (US); Brian Thomas Odegard, Ypsilanti, MI (US); Alfred John Santos, Farmington, CT (US); Orestes J. Varonis, North Canton, OH (US)

(73) Assignee: Timken US Corporation, Torington, CT (US)

( * ) Notice: Subject to any disclaimer, the term of this patent is extended or adjusted under 35 U.S.C. 154(b) by 24 days.

(21) Appl. No.: 10/851,825

(22) Filed: May 21, 2004

(65) Prior Publication Data

US 2005/0054473 A1  Mar. 10, 2005

Related U.S. Application Data

(60) Provisional application No. 60/490,377, filed on Jul. 25, 2003.

(51) Int. Cl.
*G01P 3/48* (2006.01)

(52) U.S. Cl. .................................................. 324/173

(58) Field of Classification Search ................. 324/173
See application file for complete search history.

(56) References Cited

U.S. PATENT DOCUMENTS

| | | | |
|---|---|---|---|
| 3,845,671 A | 11/1974 | Sharp et al. | |
| 4,002,937 A | 1/1977 | Anson | |
| 4,586,401 A | 5/1986 | Nogle | |
| 4,875,785 A | 10/1989 | Santos et al. | |
| 4,905,507 A | 3/1990 | Klein et al. | |
| 4,911,000 A | 3/1990 | Takase et al. | |
| 4,934,501 A | 6/1990 | Gay et al. | |
| 5,067,350 A | 11/1991 | Grillo et al. | |
| 5,067,355 A | 11/1991 | Witte | |
| 5,157,966 A | 10/1992 | Lugosi et al. | |
| 5,269,201 A | 12/1993 | Uematsu | |
| 6,064,198 A | 5/2000 | Wolf et al. | |

(Continued)

FOREIGN PATENT DOCUMENTS

DE    19826068    12/1999

(Continued)

*Primary Examiner*—Reena Aurora
(74) *Attorney, Agent, or Firm*—The Webb Law Firm, P.C.

(57) ABSTRACT

A device for sensing the input shaft speed of an automotive automatic transmission that is driven by the engine through the fluid coupling of a torque converter. The speed sensor device includes circumferentially spaced markings about the transmission input shaft and a speed sensor that is placed at close proximity to the circumferentially spaced markings through a hole in the torque converter stator shaft. An electronic control unit (ECU) analyzes the sensor output signal and in the case of an active speed sensor it also functions as its power source. During vehicle operation, the transmission input shaft rotates the target wheel in front of the speed sensor causing modulation of its output signal. The electronic control unit analyzes the signal modulation and calculates the input shaft rotational speed. A variety of sensor/target-wheel options and sensor mounting techniques could be used depending on the application constraints.

39 Claims, 8 Drawing Sheets

U.S. PATENT DOCUMENTS

| | | |
|---|---|---|
| 6,291,989 B1 | 9/2001 | Schroeder |
| 6,405,593 B1 | 6/2002 | Palfenier et al. |
| 6,522,133 B1 | 2/2003 | Haupt et al. |
| 6,538,426 B1 | 3/2003 | Enrietto et al. |
| 6,846,260 B2 * | 1/2005 | Horiuchi ............ 475/125 |
| 6,969,986 B2 * | 11/2005 | Schmid et al. ............ 324/166 |
| 2003/0109346 A1 | 6/2003 | Horiuchi |
| 2003/0160605 A1 | 8/2003 | Michalek et al. |

FOREIGN PATENT DOCUMENTS

| | | |
|---|---|---|
| DE | 10017542 | 10/2001 |
| EP | 0213732 | 3/1987 |
| JP | 08093898 | 4/1996 |

\* cited by examiner

TRANSMISSION INPUT SHAFT SPEED MEASURING ASSEMBLY

This application claims the benefit of U.S. Provisional Patent Application No. 60/490,377 filed on Jul. 25, 2003.

BACKGROUND

Knowledge of input and output shaft speeds for an automatic transmission would enable its control unit to execute smooth transmission shifts leading to enhanced vehicle performance. Although output-shaft speed measurement of an automatic transmission is easily accomplished, speed measurement of its input shaft is difficult due to the transmission complexity and its input shaft inaccessibility. Current methods for input-shaft speed measurement, such as the ones described in U.S. Pat. Nos. 6,522,133B1, 4,586,401 and 3,845,671, require a magnetic sensor that senses either the rotation of a large magnetic target wheel through a non-ferromagnetic reaction shell or the rotation of a transmission output gear. These solutions require sensors that are bulky and expensive for sensing rotating target wheels at great distances, expensive magnetic target wheels due to their large size, the use of an expensive non-ferromagnetic reaction shell, and placement of sensors through a hole on the transmission housing that requires robust sealing methods. Also, in certain designs where the large air-gap between the sensor and the target wheel requires the choice of a VR speed sensor, the resulting output signal does not allow low speed measurements.

SUMMARY

The present invention relates to a device for sensing the speed of an automotive automatic transmission input shaft that is part of a transmission input assembly. The transmission input assembly comprises a transmission input shaft, the associated transmission torque converter stator shaft, and the corresponding transmission pump housing. The device comprises a sensor positioned adjacent the input shaft and configured to sense a plurality of markers circumferentially spaced about the input shaft. The circumferentially spaced markers may be formed directly in the input shaft or may be provided by a target wheel attached onto the transmission input shaft having a plurality of markers circumferentially spaced about the wheel. For example, the markers may be metallic teeth or a series of alternating magnetic poles around the wheel's outer diameter ("OD") surface. The speed sensor is placed at close proximity to the circumferential markers through a hole in the torque converter stator shaft.

DESCRIPTION OF THE PREFERRED EMBODIMENTS

Figure 1:
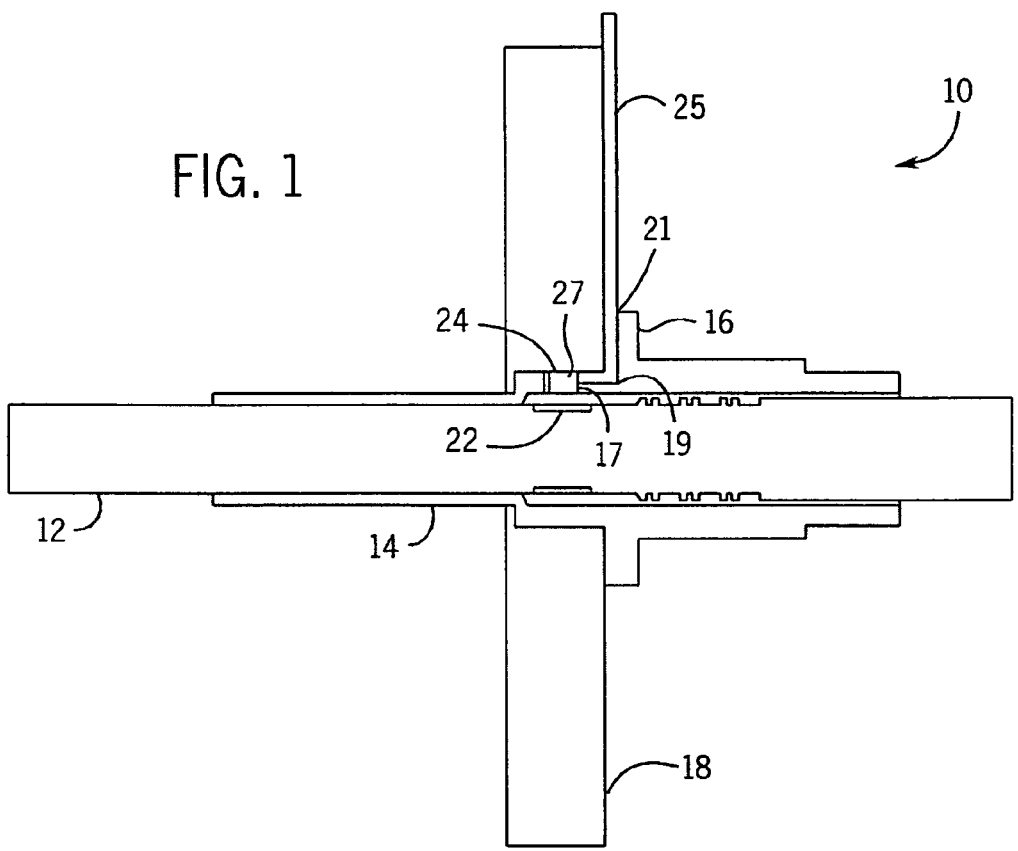
FIG. 1 is a side elevation view in partial section of a transmission input assembly incorporating a speed sensing device according to a first embodiment of the present invention.

While the invention is susceptible of embodiment in many different forms, there is shown in the drawings and described in detailed preferred embodiments of the invention. It is understood that the present disclosure is to be considered only as an example of the principles of the invention. This disclosure is not intended to limit the broad aspect of the invention to the illustrated embodiments. The scope of the protection should only be limited by the accompanying claims.

A first embodiment of the invention will be described with reference to FIG. 1-14. Referring to FIG. 1, the transmission input shaft assembly 10 generally comprises an input shaft 12, a torque converter stator shaft 14 positioned about the input shaft 12 and the transmission pump housing 18 positioned about the input shaft 12 and the torque converter stator shaft 14. The torque converter stator shaft 14 typically includes a radial flange 16 extending adjacent the side wall of the pump housing 18. The speed sensing device 20 generally includes a plurality of circumferentially spaced markings 22 about the input shaft 12 and a sensor 24 extending through the torque converter stator shaft 14 in close proximity to the circumferentially spaced markings 22.

Figure 2:
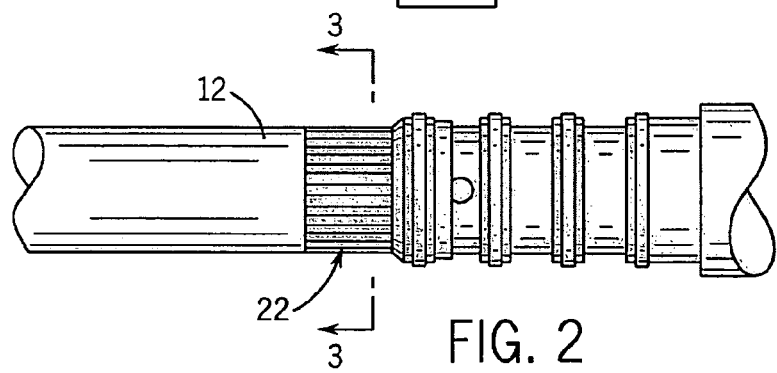
FIG. 2 is a top plan view of a transmission input shaft having a plurality of circumferential markings formed thereon.
Figure 3:
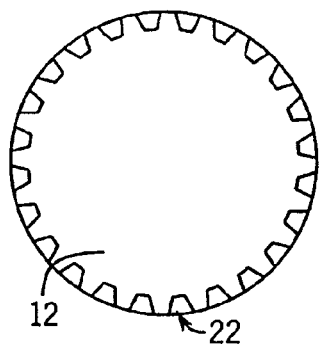
FIG. 3 is a cross sectional view along the line 3-3 in FIG. 2.
Figure 4:
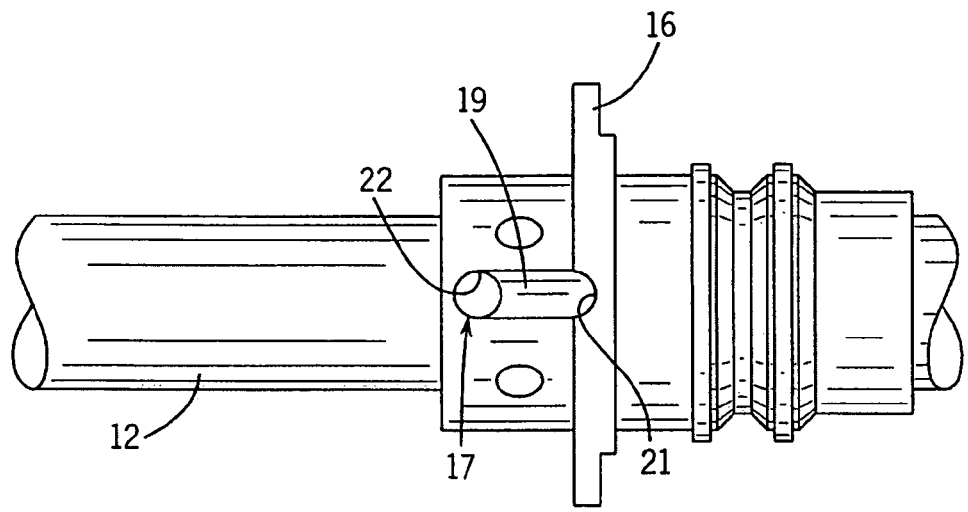
FIG. 4 is a top plan view of the transmission input shaft and the associated transmission torque converter stator shaft of FIG. 1.
Figure 5:
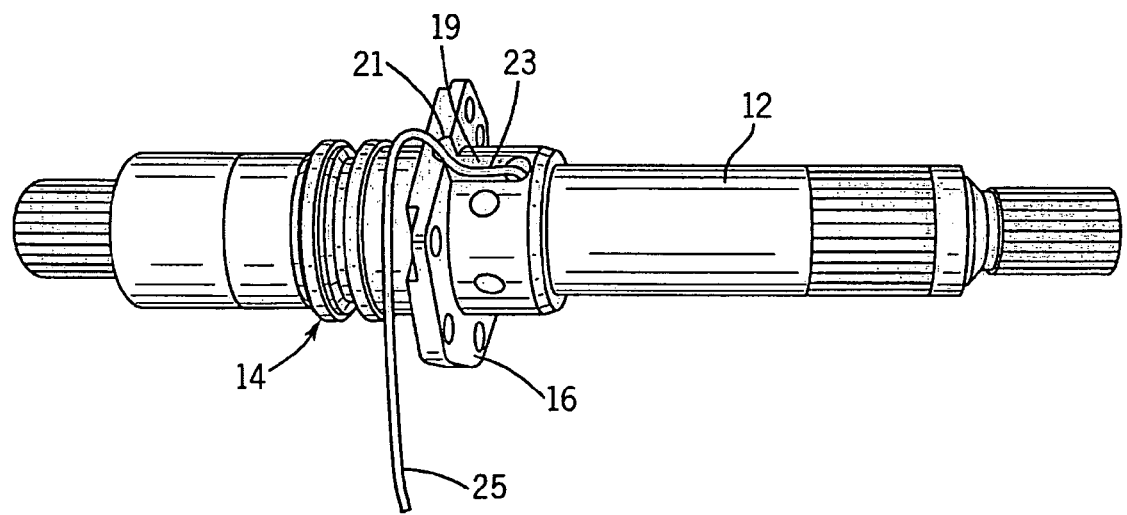
FIG. 5 is an isometric view of the transmission input shaft and the associated transmission torque converter stator shaft of FIG. 1 with the speed sensor device according to the first embodiment positioned therewith.
Figure 6:
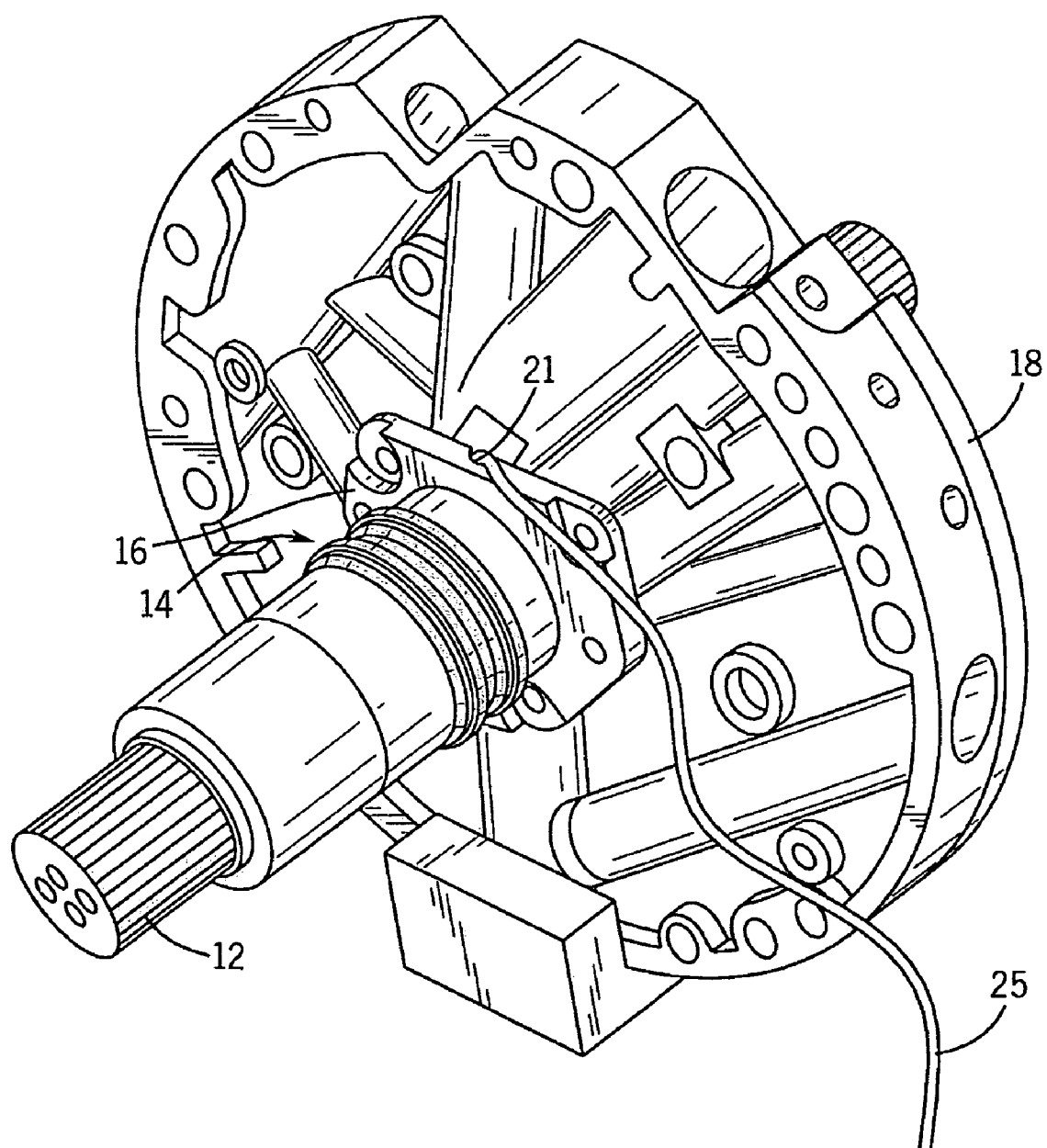
FIG. 6 is an isometric view of the transmission input shaft assembly of FIG. 1 with the speed sensor device according to the first embodiment positioned therewith.

Referring to FIGS. 1-6, the torque converter stator shaft 14 includes a hole 17 therethrough configured to receive the sensor 24. As seen in FIG. 4, the hole 17 is aligned with the circumferentially spaced markings 22 such that the sensor 24, positioned in the hole 17, will be aligned with and in close proximity to the circumferentially spaced markings 22. The sensor 24 has a body 27 configured to plug and seal the hole 17. To accommodate the cable 25 extending from the sensor 24, an axial groove 19 extends along the torque converter stator shaft 14 from the hole 17 to a radial groove 21 extending along the torque converter stator shaft flange 16. As can be seen in FIGS. 5 and 6, the cable 25 can be run through the grooves 19 and 21 and then along the wall of the pump housing 18 and out of the transmission assembly 10 without providing substantial obstruction. A seal member 23 may be used to fill the groove 19 to further ensure sealing of the hole 17.

The speed sensor cable 25 exits the transmission assembly 10 radially and is connected to an electronic control unit (ECU) that analyzes its output signal. In the case of an active speed sensor, the ECU provides power to the sensor. As the circumferentially spaced markings 22 rotate with the input shaft 12 in front of the speed sensor 24, the sensor output signal is modulated and the ECU calculates the input shaft 12 rotational speed. The sensor 24 preferably has dual sensing elements which can, for example, be utilized for noise cancelation. In certain applications where direction of rotation is also desired, the dual sensing elements may be configured to determine the direction of rotation. In addition, the sensor 24 may be configured to provide a temperature measurement within the torque converter stator shaft 14. Commonly owned PCT Application No. PCT/US03/32692, herein incorporated by reference, describes a system of obtaining a temperature measurement with a VR sensor. Alternatively, a separate temperature sensor may be integrated with the active speed sensor in order to provide temperature measurement at a location deep inside the transmission interior. Depending on the design configuration, various hardware and software, for example, a specially designed ASIC, can be used.

Depending on the application constraints, the circumferentially spaced markings 22 can be provided in a variety of ways. For example, as illustrated in FIGS. 2 and 3, the circumferentially spaced markings 22 can be defined around the input shaft 12 by machining, forming or otherwise providing splines into OD surface of the input shaft 12. Alternatively, the circumferentially spaced markings 22 can be provided by attaching a target wheel incorporating the markings 22 to the input shaft 22. A variety of target wheels are illustrated in FIGS. 7-14. The target wheel can be attached to the input shaft 12 in a variety of ways, for example, but not limited to, press-fitting, welding, or bolting of the target wheel onto the input shaft 12 OD surface.

Figure 7:
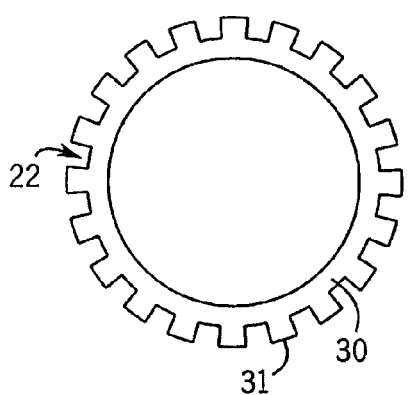
FIG. 7 is a side elevation view of a gear ring useable as a target wheel in the present invention.
Figure 8A:
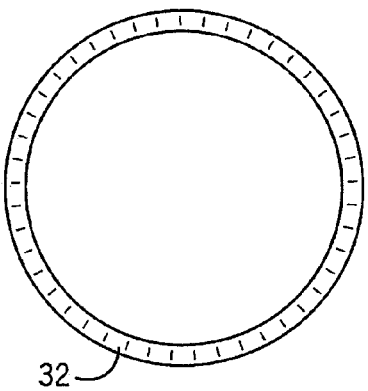
FIG. 8a is a side elevation view and FIG. 8b is a front elevation view of a cage ring useable as a target wheel in the present invention.
Figure 8B:
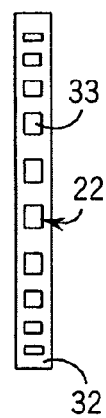
Figure 8C:
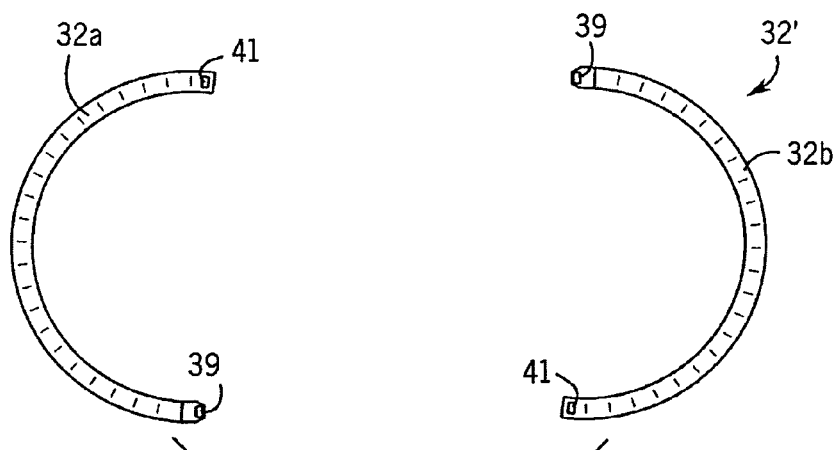
FIG. 8c is a side elevation view of a cage ring similar to that of FIGS. 8a and 8b.

The variety of illustrated target wheels will be described with reference to FIGS. 7-14. FIG. 7 illustrates a gear ring 30 with a plurality of teeth 31 that define the circumferentially spaced markings. The gear ring may be manufactured in various ways, for example, from powdered metal or may be a stamped metal gear ring. FIGS. 8a and 8b illustrate a stamped metal cage ring 32 made from one or more sections and having a plurality of openings 33 that define the circumferentially spaced markings 22. FIG. 8c illustrates a stamped metal cage ring 32' similar to that shown in FIGS. 8a and 8b, with the cage ring 32' being formed in to halves 32a and 32b to facilitate positioning about the input shaft 12. Each halve 32a, 32b has a projecting tab 39 and a retaining slot 41 for interconnection of the two halves 32a, 32b about the input shaft 12. Other interconnection means may also be utilized. Additionally, the multi-piece configuration may be utilized for other target wheel types other than the stamped metal cage. For example, the split pair of magnetic rings 46 illustrated in FIG. 12 and described hereinafter may be formed with interconnecting ends.

Figure 9:
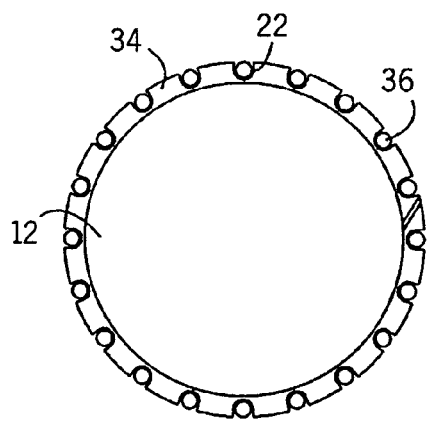
FIGS. 9-13 are side elevation views of various molded rings useable as a target wheel in the present invention.
Figure 10:
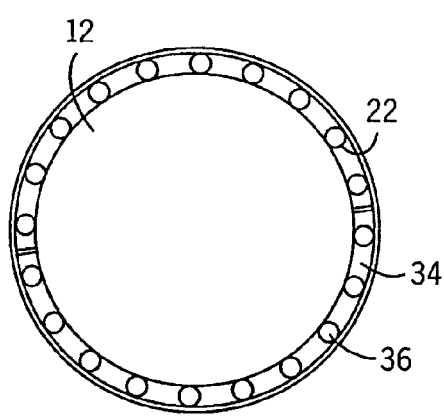
Figure 11:
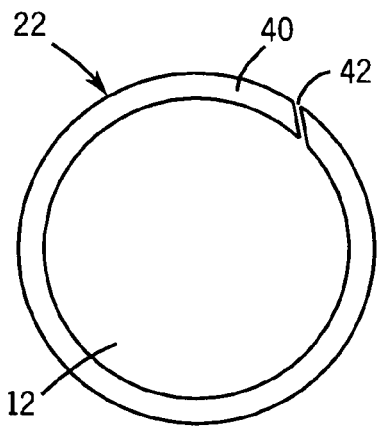
Figure 12:
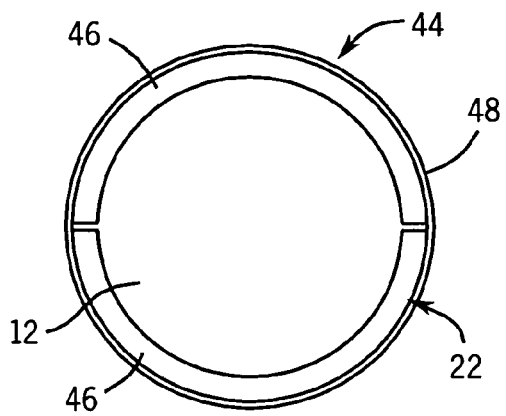
Figure 13:
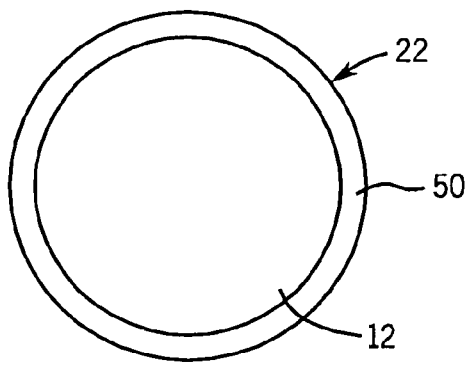
Figure 14A:
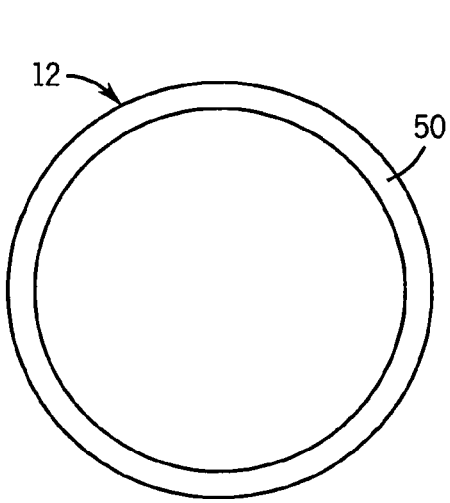
FIG. 14a is a side elevation view and FIG. 14b is a front elevation view of a molded ring with side ribs useable as a target wheel in the present invention.
Figure 14B:
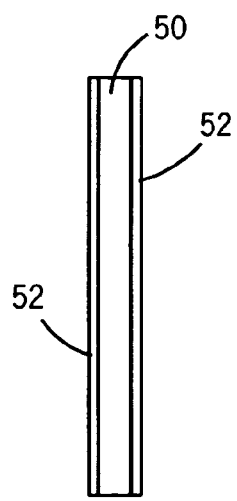

FIG. 9 illustrates a molded ring 34 with a plurality of spaced apart metallic inserts 36 that define the circumferentially spaced markings 22. FIG. 10 illustrates a target wheel similar to FIG. 9 but further including a protective rim 38 positioned thereabout. FIGS. 11-13 illustrate molded multi-pole magnetic rings 40, 44 and 50 for use as the target wheel. The multi-pole magnetic ring 40 of FIG. 11 includes a split 42 for facilitating positioning about the input shaft 12. The multi-pole magnetic ring 44 of FIG. 12 includes a split pair of magnetic rings 46 with a retaining band 48 thereabout. The multi-pole magnetic ring 50 of FIG. 11 is configured as an elastic member configured to be slipped over the input shaft 12. FIGS. 14a and 14b illustrates a multi-pole magnetic ring similar to that shown in FIGS. 11, 12 and 13, with protective ribs 52 positioned about the ring 50.

The sensor 24 can be any one of the available speed sensors such as a VR sensor, a Hall-Effect sensor, a Magnetoresistive sensor, a GMR sensor, or an Eddy Current sensor. The type of sensor 24 is selected to be compatible with the chosen circumferentially spaced markings 22. For example, if the circumferentially spaced markings 22 are defined by teeth formed around the normally ferromagnetic input shaft by machining its OD surface, or a ferromagnetic gear-ring 30 target wheel is placed around the input shaft 12, a VR sensor, a Hall sensor, a Magnetoresistive sensor, or a GMR sensor with a back-biased magnet can be used. A multi-pole magnetic target wheel placed around the input shaft 12 preferably utilizes a magnetic sensor without the back-biased magnet. Alternatively, an Eddy Current sensor is preferably utilized with circumferentially spaced markings 22 defined by a ferromagnetic material or a non-ferromagnetic conductive material.

Figure 15:
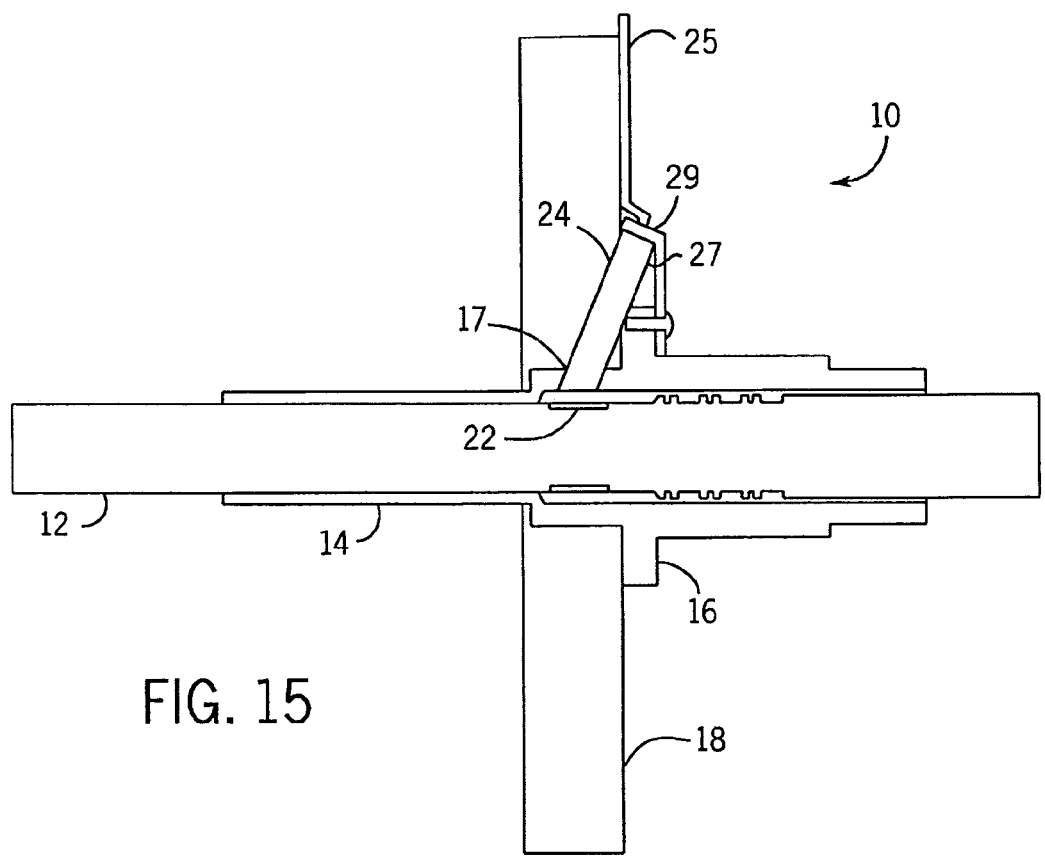
FIG. 15 is a side elevation view in partial section of a transmission input assembly incorporating a speed sensing device according to a second embodiment of the present invention.

Referring to FIG. 15, an alternate embodiment of the invention is illustrated. The circumferentially spaced markings 22 are provided around the transmission input shaft 12 at a point along its axial length so that, in the final transmission assembly, the markings 22 are directly underneath the pump housing 18. The chosen sensor 24 is mounted over the circumferentially spaced markings 22 after the pump housing 18 placement over the torque converter stator shaft 14 through an angled hole 17 from the pump housing sidewall to the stator 14 ID surface. The sensor body 27 forms a sealed cylindrical plug inside the sensor hole 17 and extends beyond the pump housing 18 sidewall. In the illustrated embodiment, the sensor body 27 is mounted to the stator radial flange 16 by a clip 29 or the like. Alternatively, the sensor body 27 may be secured to the pump housing 18 or otherwise secured within the angled hole 17, for example, by an interference fit. Beyond the pump housing 18, the sensor cable 25 exits the transmission assembly 10 radially routed along the sidewall of the transmission pump housing 18.

Figure 16:
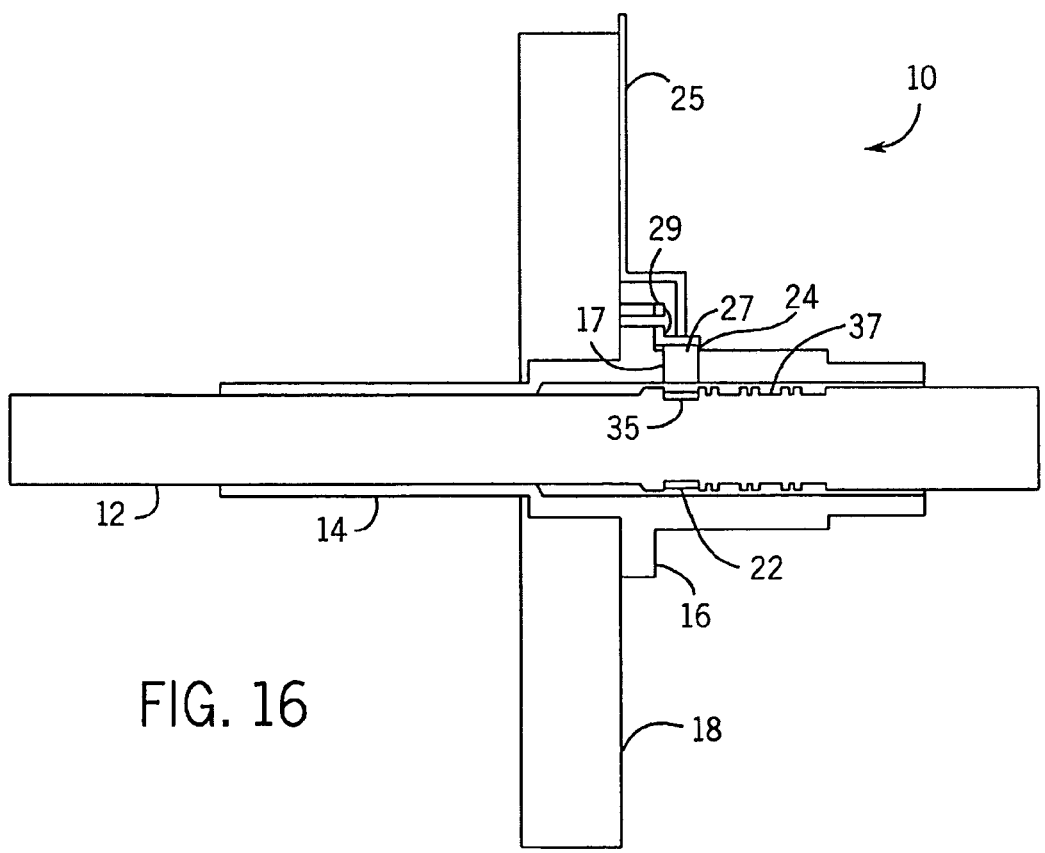
FIG. 16 is a side elevation view in partial section of a transmission input assembly incorporating a speed sensing device according to a third embodiment of the present invention.

Referring to FIG. 16, an alternate embodiment of the invention is illustrated. The circumferentially spaced markings 22 are provided around the transmission input shaft 12 inside a slot 35 next to a fluid channel 37. This may cause axial displacement of existing oil channels for certain applications. The chosen sensor 24 is mounted over the circumferentially spaced markings 22 through a radial hole 17 on the body of the torque converter stator shaft 14. The sensor body 27 forms a sealed cylindrical plug inside the sensor hole 17 and extends beyond the stator OD surface in a way that allows its mounting onto the stator radial flange 16 or any other available mounting surface by a clip 29 or the like. Beyond the stator flange 16, the sensor cable 25 exits the transmission assembly 10 radially routed along the sidewall of the transmission pump housing 18.

Figure 17:
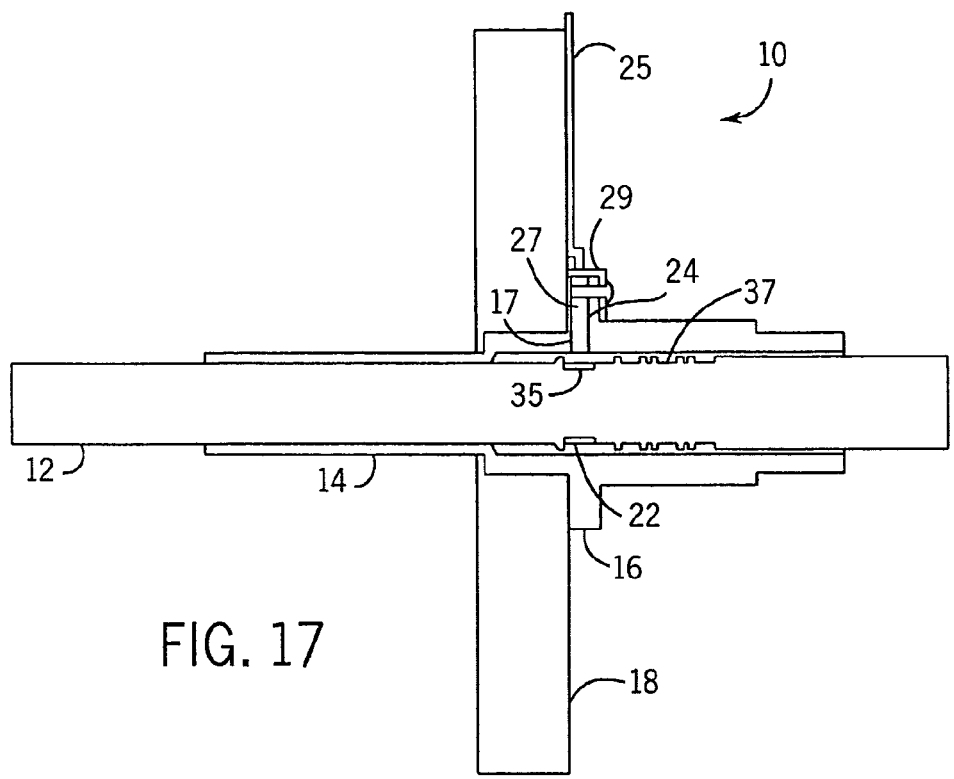
FIG. 17 is a side elevation view in partial section of a transmission input assembly incorporating a speed sensing device according to a fourth embodiment of the present invention.

Referring to FIG. 17, an alternate embodiment of the invention is illustrated. The circumferentially spaced markings 22 are provided around the transmission input shaft 12 inside a slot 35 next to a fluid channel 37. This may cause axial displacement of existing oil channels for certain applications. The chosen sensor 24 is mounted over the circumferentially spaced markings 22 through a radial hole 17 inside the torque converter stator shaft flange 16. The sensor body 27 forms a sealed cylindrical plug inside the sensor hole 17 and extends beyond the stator flange 16 in a way that allows its mounting onto the flange body. Beyond the stator flange 16, the sensor cable 25 exits the transmission assembly 10 radially routed along the sidewall of the transmission pump housing 18.

Figure 18:
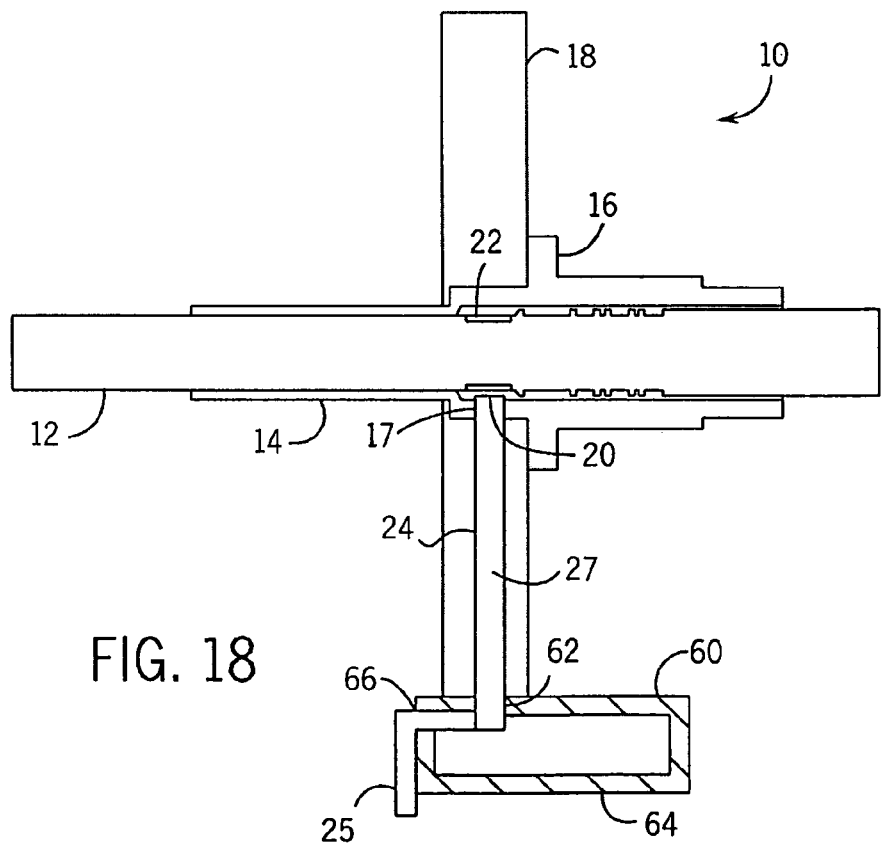
FIG. 18 is a side elevation view in partial section of a transmission input assembly incorporating a speed sensing device according to a fifth embodiment of the present invention.

Referring to FIG. 18, an alternate embodiment of the invention is illustrated. The circumferentially spaced markings 22 are provided around the transmission input shaft 12 at a point along its axial length so that, in the final transmission assembly, the markings 22 are directly underneath the pump housing 18. The pump housing 18 is formed with a radial hole 43 extending from the pump housing 18 inner diameter to the pump housing 18 outer diameter. The hole 43 may be formed in the pump housing 18 or may be drilled in to a previously manufactured pump housing 18. The pump housing radial hole 43 is aligned with a radial hole 17 in the torque converter stator shaft 14. The body 27 of the chosen sensor 24 is extended through the aligned radial holes 17 and 43 such that a forward end of the sensor is mounted in close proximity to the circumferentially spaced markings 22. The sensor body 27 forms a sealed cylindrical plug inside the sensor hole 17. The other end of the sensor body 27 extends beyond the pump housing 18. In the illustrated embodiment, the sensor body 27 extends through a hole 62 of an oil pan 60 positioned at the outer diameter of the pump housing 18. The oil pan 60 has a removable cover 64 that can be removed to access the sensor 24. The sensor body 27 is removable from the radial holes 17 and 43 through the oil pan 60 to allow service or the like of the sensor 24. The sensor cable 25 extends from the sensor body 27 and exits oil pan 60 through a sealed hole 66.

Figure 19:
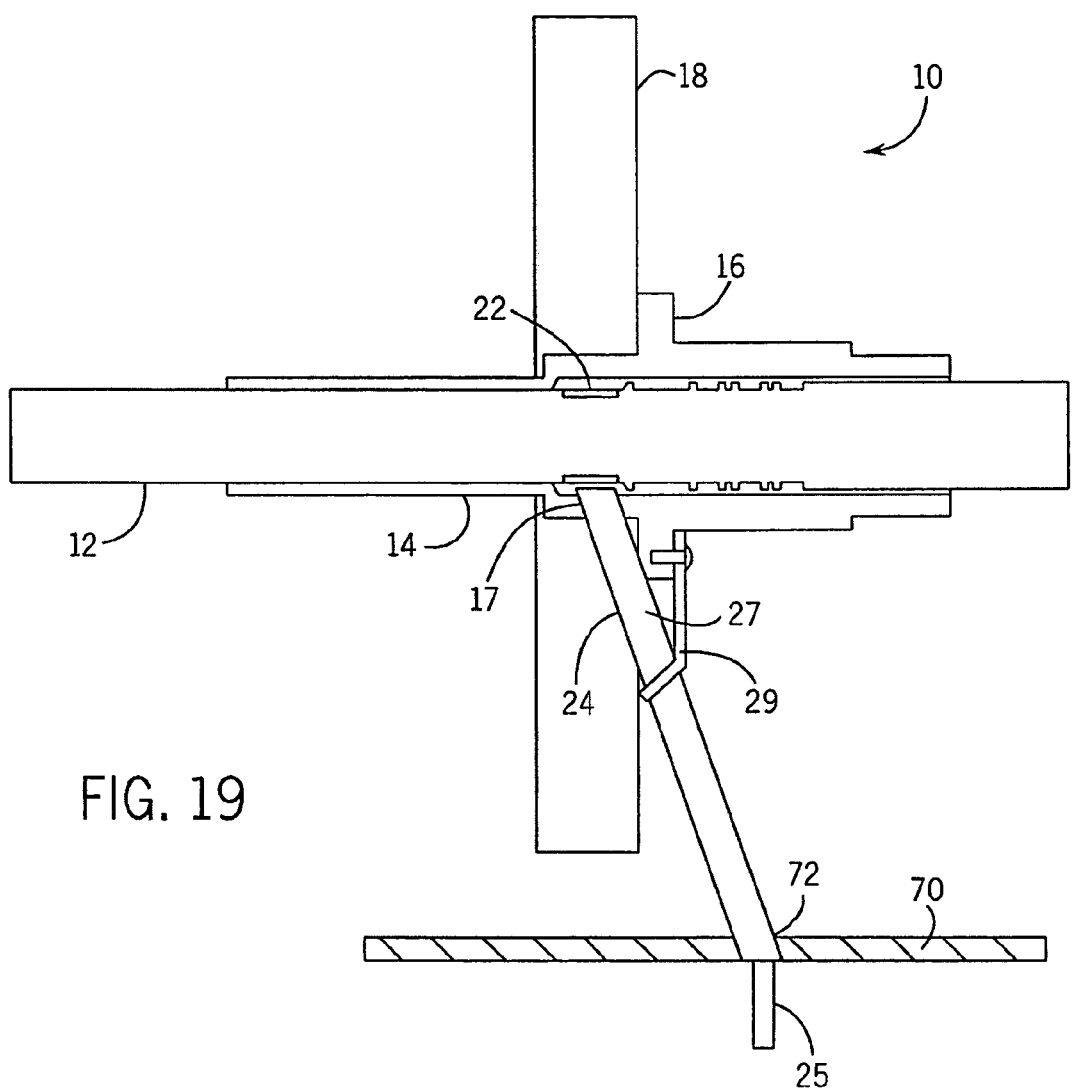
FIG. 19 is a side elevation view in partial section of a transmission input assembly incorporating a speed sensing device according to a sixth embodiment of the present invention.

Referring to FIG. 19, an alternate embodiment of the invention is illustrated. The circumferentially spaced markings 22 are provided around the transmission input shaft 12 at a point along its axial length so that, in the final transmission assembly, the markings 22 are directly underneath the pump housing 18, however, the markings 22 may be alternatively positioned. The chosen sensor 24 is mounted over the circumferentially spaced markings 22 after the pump housing 18 placement over the torque converter stator shaft 14 through an angled hole 17 from the pump housing sidewall to the stator 14 ID surface. The sensor body 27 forms a sealed cylindrical plug inside the sensor hole 17 and extends beyond the pump housing 18 sidewall. In the present embodiment, the sensor body 27 has an extended axial length configured to pass through open space in the transmission assembly 10. The extended sensor body 27 is configured to extend to an easily accessible portion of the transmission assembly 10, for example, a sealed hole 72 through the transmission bell housing 70, or alternatively, through the removal of the oil pan or the like accessible component. A clip 29 or the like can be provided to support a midsection of the sensor 24. The sensor cable 25 extends from the sensor body 27 outside of the bell housing 70 from where it routed to the ECU. If the sensor 24 requires servicing, it can be easily withdrawn through the hole 72.

The invention claimed is:

1. A device for sensing the speed of a rotating transmission input shaft positioned within an associated torque converter stator shaft, the device comprising:
    a plurality of markers circumferentially spaced about the input shaft; and
    a sensor configured to sense the markers, positioned in close proximity to the circumferential markers through a hole in the torque converter stator shaft,
    wherein the torque converter stator shaft includes an axial body with a radial flange extending therefrom, and
    wherein the flange has an outer radial surface and the axial body has a radially inner surface, the hole extending from the outer surface of the radial flange to the inner surface of the axial body and wherein the circumferential markings are axially aligned with the radial flange.

2. A device for sensing the speed of a rotating transmission input shaft positioned within an associated torque converter stator shaft, the device comprising:
    a plurality of markers circumferentially spaced about the input shaft; and
    a sensor configured to sense the markers, positioned in close proximity to the circumferential markers through a hole in the torque converter stator shaft,
    wherein the torque converter stator shaft includes an axial body with a radial flange extending therefrom, and
    wherein a transmission pump housing is mounted about the torque converter stator shaft on a first axial side of the radial flange and the hole extends through the axial body on a second axial side of the radial flange opposite the first axial side, the circumferential markers axially aligned with the hole.

3. A device for sensing the speed of a rotating transmission input shaft positioned within an associated torque converter stator shaft, the device comprising:
    a plurality of markers circumferentially spaced about the input shaft; and
    a sensor configured to sense the markers, positioned in close proximity to the circumferential markers through a hole in the torque converter stator shaft,
    wherein the torque converter stator shaft includes an axial body with a radial flange extending therefrom, and
    wherein the sensor has a body extending beyond the torque converter stator shaft axial body and a clip extends between the radial flange and the sensor body to secure the sensor.

4. A device for sensing the speed of a rotating transmission input shaft positioned within an associated torque converter stator shaft, the device comprising:
    a plurality of markers circumferentially spaced about the input shaft; and
    a sensor configured to sense the markers, positioned in close proximity to the circumferential markers through a hole in the torque converter stator shaft,
    wherein a transmission pump housing is mounted about the torque converter stator shaft and the circumferential markers are axially aligned with the transmission pump housing, wherein the hole in the torque converter stator shaft is aligned with a hole extending through the transmission pump housing such that the sensor extends through the transmission pump housing hole and the torque converter stator shaft hole.

5. The device of claim 4 wherein a clip extends between the sensor body and the transmission pump housing to secure the sensor.

6. The device of claim 4 wherein the torque converter stator shaft hole is angled relative to the axial body and the transmission pump housing hole is angled relative to the transmission pump housing such that the sensor extends out a side wall of the transmission pump housing.

7. The device of claim 4 wherein the torque converter stator shaft hole is normal to the axial body and the transmission pump housing hole extends radial through the transmission pump housing such that the sensor extends out a radially outer surface of the transmission pump housing.

8. The device of claim 7 wherein an oil pan is positioned adjacent the radially outer surface of the transmission pump housing and the sensor extends adjacent the oil pan such that the sensor is accessible through removal of the oil pan.

9. The device of claim 4 wherein the sensor is configured to sense the direction of rotation of the input shaft.

10. The device of claim 4 wherein the sensor is configured to sense a temperature adjacent the input shaft.

11. The device of claim 4 wherein the input shaft has an outer surface and the circumferential markings are formed integrally about the shaft outer surface.

12. The device of claim 11 wherein the circumferential markings include a plurality of splines about the shaft outer surface.

13. The device of claim 4 wherein the circumferential markings are provided by a target wheel positioned about the input shaft.

14. The device of claim 13 wherein the target wheel includes a gear ring with a plurality of circumferentially spaced teeth.

15. The device of claim 13 wherein the target wheel includes a metal cage ring having a plurality of circumferentially space openings.

16. The device of claim 13 wherein the target wheel includes at least two parts that are positioned about the input shaft and interconnected to define a ring about the input shaft.

17. The device of claim 16 wherein the at least two parts includes a multi-component multi-pole magnetic ring.

18. The device of claim 13 wherein the target wheel includes a molded ring with a plurality of circumferentially spaced apart metallic inserts.

19. The device of claim 18 wherein the target wheel further includes a protective rim positioned about the molded ring.

20. The device of claim 13 wherein the target wheel includes a multi-pole magnetic ring.

21. The device of claim 20 wherein the multi-pole magnetic ring includes a split for facilitating positioning about the input shaft.

22. The device of claim 20 wherein the multi-pole magnetic ring includes a split pair of magnetic rings with a retaining band thereabout.

23. The device of claim 20 wherein the multi-pole magnetic ring is configured as an elastic member configured to slip over the input shaft.

24. The device of claim 20 wherein the multi-pole magnetic ring includes protective ribs positioned about the ring.

25. The device of claim 4 wherein a transmission housing is positioned about the device and the sensor has a body extending from the torque converter stator shaft hole to a hole in the transmission housing such that the sensor is removable through the transmission housing hole.

26. The device of claim 25 wherein the sensor body seals the transmission housing hole.

27. The device of claim 25 wherein a support member supports a midsection of the sensor body.

28. The device of claim 25 wherein an oil pan sealing covers the transmission housing hole and removal of the oil pan provides access to the sensor body.

29. A device for sensing the speed of a rotating transmission input shaft positioned within an associated torque converter stator shaft, the device comprising:
 a plurality of markers circumferentially spaced about the input shaft; and
 a sensor configured to sense the markers, the sensor positioned within a hole in the torque converter stator shaft and in close proximity to the circumferential markers,
 wherein a transmission pump housing is positioned about the torque converter stator shaft and the circumferential markers are axially aligned with the transmission pump housing, and the hole in the torque converter stator shaft is aligned with a hole in the transmission pump housing.

30. The device of claim 29 wherein the sensor is configured to sense the direction of rotation of the input shaft.

31. The device of claim 29 wherein the sensor is configured to sense a temperature adjacent the input shaft.

32. The device of claim 29 wherein the input shaft has an outer surface and the circumferential markers are formed integrally about the input shaft outer surface.

33. An automatic transmission comprising:
 a torque converter shaft having a hole;
 a radially directed flange extending from the torque converter shaft;
 an input shaft positioned within the torque converter shaft and having a plurality of circumferentially spaced markers;
 a transmission pump housing positioned about the torque converter shaft and adjacent the radially directed flange; and
 a speed sensor configured to sense the markers, positioned in close proximity to the circumferential markers through the hole in the torque converter shaft, wherein
 the circumferential markers are axially aligned with the transmission pumn housing wherein the hole in the torque converter stator shaft is aligned with a hole extending through the transmission pump housing such that the sensor extends through the transmission pump housing hole and the torque converter stator shaft hole.

34. The automatic transmission of claim 33 further comprising securing means for affixing the speed sensor in close proximity to the circumferential markers.

35. The automatic transmission of claim 34 wherein the securing means comprise clipping means for mounting the speed sensor to the radially directed flange.

36. The automatic transmission of claim 33 wherein the input shaft has an outer surface and the circumferential markings are formed integrally about the input shaft outer surface.

37. The device of claim 33 wherein the torque converter stator shaft hole is angled relative to the axial body and the transmission pump housing hole is angled relative to the transmission pump housing such that the sensor extends out a side wall of the transmission pump housing.

38. A device for sensing the rotation of a rotating transmission input shaft positioned within an associated torque converter stator shaft, the device comprising:

a plurality of markers circumferentially spaced about the input shaft; and a sensor configured to sense the markers, positioned in close proximity to the circumferential markers through a hole in the torque converter stator shaft, wherein a transmission pump housing is mounted about the torque converter stator shaft, wherein the hole in the torque converter stator shaft is aligned with a hole extending through the transmission pump housing such that the sensor extends through the transmission pump housing hole and the torque converter stator shaft hole.

39. The device of claim 38 wherein the torque converter stator shaft hole is angled relative to the axial body and the transmission pump housing hole is angled relative to the transmission pump housing such that the sensor extends out a side wall of the transmission pump housing.

\* \* \* \* \*

UNITED STATES PATENT AND TRADEMARK OFFICE
CERTIFICATE OF CORRECTION

PATENT NO. : 7,285,949 B2 Page 1 of 1
APPLICATION NO. : 10/851825
DATED : October 23, 2007
INVENTOR(S) : James J. Burns It is certified that error appears in the above-identified patent and that said Letters Patent is hereby corrected as shown below:

Column 8, line 45, Claim 33, "transmission pumn housing" should read
-- transmission pump housing --

Signed and Sealed this

Sixth Day of May, 2008

JON W. DUDAS
*Director of the United States Patent and Trademark Office*